United States Patent Office 3,472,940
Patented Oct. 14, 1969

3,472,940
STABLE GELLED ALCOHOL COMPOSITIONS CONTAINING SODIUM ACYL LACTYLATES
Lloyd I. Osipow, New York, N.Y., and Dorothea Marra, Summit, N.J., assignors to C. J. Patterson Company, Kansas City, Mo., a corporation of Missouri
No Drawing. Filed Mar. 25, 1965, Ser. No. 442,809
Int. Cl. A61k 23/00, 7/00, 9/00
U.S. Cl. 424—365          5 Claims

ABSTRACT OF THE DISCLOSURE

Stable gelled alcohol compositions having a gelled vehicle essentially consisting of at least one water soluble alcohol and water gelled with a sodium acyl lactylate of the formula

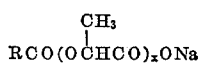

wherein RCO is the acyl radical of a saturated fatty acid of 16 to 22 carbon atoms and $x$ is a number between about 1 and 4 at a pH of at least about 8 which is sufficient to stabilize such gelled composition.

---

The present invention relates to improved gelled alcohol compositions containing a novel gelling agent.

Gelled alcohol compositions are widely used in the form of sticks in cosmetics. Depending upon the special agents included in such compositions, they can for example, be used as colognes, after-shave preparations, deodorants, sun screening preparations.

The gelling agent which has most commonly been used in the preparation of the gelled alcohol compositions is sodium stearate. The sodium stearate can be used as such by dissolving it in hot alcohol. Alternatively, it can be formed in situ by dissolving stearic acid in hot alcohol and introducing an equivalent amount of sodium hydroxide dissolved in a small amount of water. In either instance the hot composition is poured into molds where it solidifies on cooling.

The use of sodium stearate in alcohol gels, however, is accompanied by a number of disadvantages. For example, the composition will not solidify (gel) if the pH of the composition is much below that of the "neutral" soap, that is, a pH of about 10.2. The high alkalinity required places a serious limitation on the use of delicate fragrances in the alcohol compositions as only perfume ingredients which are stable at such high pH can be used. The same limitations are encountered in the use of colors.

A further disadvantage of the gelled sodium stearate/ alcohol composition is its limited water tolerance. If the composition contains more than about 35% by weight of water it will liquify at 110° F. or below a temperature likely to be encountered in non-ventilated areas in hot summer weather. Cosmetic laboratories often age test samples of gelled alcohol compositions at 110° F. to simulate the elevated temperatures likely to be encountered during storage or shipping. Because of this limited water tolerance many individuals find use of such alcohol compositions unpleasant. For example, when used as after-shave compositions there are complaints of excessive sting. Also, irritation is sometimes encountered when such products are used as underarm deodorants shortly after shaving in this area.

It is an object of the present invention to provide stable gelled alcohol compositions at pH values as low as about 8.0. It is a further object of the present invention to provide stable gelled alcohol compositions in which the water content, if desired, can be up to 50% by weight and over.

Still another object of the invention is to be able to provide gelled alcohol compositions which have more slip than conventional gelled sodium stearate/alcohol compositions.

The term "stable" is employed herein in connection with the gelled shaped compositions according to the invention to indicate that such gelled compositions remain solid at temperatures at least as high as body temperature and at most only suffer slight syneresis at 110° F.

According to the invention it was found that these and other objects, which will become apparent from the description given below, can be attained by preparation of cosmetic gelled alcohol compositions with the aid of sodium acyl lactylates of essentially the following general formula:

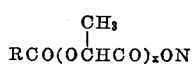

wherein RCO is the acyl radical of a saturated fatty acid having 16 to 22 carbon atoms, such as, for example, palmitic, stearic and behenic acids, and $x$ is a number from about 1 to 4, preferably, about 1 to 2. In the nomenclature employed herein, as in sodium stearyl-2-lactylate, the number 2 signifies the $x$ in the above formula.

The sodium acyl latylate products concerned are produced by methods described in U.S. Patent 2,733,252 directed to the production of salts of fatty acid esters of lactylic acids using the appropriate fatty acid and lactic acid. The products in general are mixtures and therefore the values for $x$ generally are average values. Nevertheless, separations such as on a chromatographic column, can be effected. Also, even when salts are prepared, in practical scale processes, some free acids are present so that the product as obtained normally is acid when dispersed in water with a pH of about 3 to 5. The pH of such acid products can be adjusted by addition of an appropriate amount of an alkaline sodium compound, such as sodium hydroxide or sodium carbonate.

The presence of sodium salts of fatty acids per se, such as sodium stearate or the free fatty acid, along with the sodium salts of fatty acyl lactylates is permissible insofar as, as has already been indicated above, fatty acid salts such as sodium stearate in themselves do exert a gelling effect even though under more stringent conditions. In some instances the quantity of sodium salts of the fatty acids per se which may be present are such that the composition taken as a whole, that is, the sodium salt of the fatty acid lactylate plus the sodium salt of the fatty acid per se, gives a product in which the value of $x$ is less than 1, for example, about 0.5–0.9. Such composition can be obtained by simple admixture of the sodium salts of the fatty acids per se with the sodium salts of the fatty acid lactylates or by preparation of fatty acid lactylates using less than 1 mol of lactic acid per mol of fatty acid.

While the acid products do not form satisfactory gels when mixed with hot alcohol and the mixture allowed to cool, when their pH has been adjusted so that they are at least moderately alkaline, pH about 8, they are capable of producing the desired gels. The minimum pH required depends upon the nature of the sodium acyl lactylate concorned as well as the quantity of water contained in the composition and, for example, is about 8.0 with sodium stearyl-2-lactylate, about 8.8 with sodium palmityl and behenyl-2-lactylates with a water content of 2 to 10% by weight; about 9 with sodium stearyl-2-lactylate and about 9.5 with sodium, palmityl and behenyl-2-lactylates with a water content of 25% and about 9.5 with sodium stearyl-2-lactylate and about 10 with sodium palmityl and behenyl-2-lactylates with a water content of 50%. In addition, the quantity of sodium acyl lactylate employed also influences the firmness of the gelled product, increasing quantities favoring firmness. Preferably, the quantities of water employed are between about 4-5% and 50%, although higher and lower concentrations can be used with appropriate increase in pH and sodium acyl lactylate concentration. Acceptable sodium acyl lactylate concentrations range from about 5% to about 25% and preferably from about 7% to 15%. While gels can be obtained with lower sodium acyl lactylate concentrations, for example, about 2%, such gels are generally too soft for most desired applications. As the concentration of the sodium acyl lactylate increases the gel obtained gradually becomes more firm. When the gel is to be used by rubbing against the skin to transfer the contents thereof to the skin, a gel which is too soft will transfer too much material to the skin whereas, on the other hand, when it is too hard, insufficient material will be transferred to the skin.

It was also found that the number of lactylate groups present in the sodium acyl lactylate has some effect upon the firmness of the gel obtained, those wherein $x=1$ providing the greatest firmness and those wherein $x=2, 3, 4$ each respectively producing a somewhat lower firmness so that the quantities required to produce the same degree of firmness decreases when $x$ decreases from 4 to 1.

The ability to adjust the firmness of the gels produced according to the invention by appropriate adjustment of the pH, water content and sodium acyl lactylate content with respect to each other renders it possible to provide a degree of firmness most suited for the application in question.

The gelled alcohol compositions according to the invention may also include humectants, namely, polyols, such as propylene glycol, glycerine, in a quantity of about 2% to 10% by weight as is customary in gelled sodium-stearate-alcohol compositions in order to retard crystallization of the gelling agent at exposed surfaces of the composition due to drying. The humectants are essentially replacements for the alcohol when determining the lowest pH at which stable gels are formed. Larger quantities of the polyols can also be used and in some instances the alcohol can be entirely replaced by the polyol while still obtaining a stable firm composition but the high polyol content has a tendency to give the gelled composition an undesirable greasy feel.

It furthermore is also possible to replace the ethanol most commonly used in cosmetic gelled alcohol compositions with other water soluble alkanols such as n-propanol and isopropanol and obtain analogous compositions.

The gelled alcohol compositions according to the invention are especially adapted to serve as vehicles for cosmetic materials which are compatible with alcohol, such as the usual perfuming or odorizing materials, for instance, lavender, lemon grass, citronella, rose, geranium and orange flower oils, artificial musk, menthol and the like; dyes, sun screening agents or pigments, such as ochre, umber, titanium dioxide, chalk and the like. In general those additives which are soluble in alcohol and/or water are considered as a replacement for the alcohol and are customarily employed in relatively small quantities of about 0.1% to about 5% by weight of the gelled alcohol composition. The quantity of insoluble pigments included, which essentially are diluents, is limited by the effect thereof on the gel nature of the composition. For example, gelled alcohol compositions according to the invention containing up to about 50% by weight of powdered chalk are still utilizable although they are rather rigid compositions of poor lubricity.

The following examples will serve to illustrate the invention. The compositions in each of the examples give stable gelled compositions most of which are completely stable at temperatures up to 100° F. (43° C.) without liquification and a few of which are at least completely stable at body temperature and only show slight syneresis at 110° F. so that they are well suited for cosmetic application under most conditions. Examples 1 and 2 are illustrative of the basic gelled alcohol compositions, that is, without incorporation of cosmetic ingredients such as dyes, perfumes, deodorants, sun screening agents, pigments and Examples 3-5 are illustrative of gelled alcohol compositions in which cosmetic materials have been incorporated. In each instance the compositions were prepared by heating a mixture of the sodium acyl lactylate and alcohol to about 60-65° C. until complete solution was attained, the alkali (NaOH) and water were heated separately to the same temperature and the hot alcohol and water phases mixed and the mixture cast into molds and allowed to cool to effect solidification. The cosmetic additives were made to the phase in which they are most soluble before the phases were mixed. The pigment was preferably admixed with the hot mixture immediately before it was cast into the molds to minimize settling of the pigment. The pH of the compositions indicated was determined by combining 1 part by weight of the gelled composition with 2 to 3 parts by weight of water, heating the combination to effect a uniform dispersion, cooling with stirring to break the gel structure and measuring the pH electrometrically. The portions are given in percent by weight.

EXAMPLE 1

The compositions below essentially consist of the fatty acylate, ethanol (the remainder), water and sufficient NaOH to give the pH indicated.

| Composition | Na acyl lactylate | Percent by weight | pH | H₂O percent by weight |
|---|---|---|---|---|
| A | Sodium stearyl-2-lactylate | 10 | 7.9 | 2.7 |
| B | do | 10 | 8.9 | 3 |
| C | do | 14 | 8.8 | 2 |
| D | do | 14 | 9.8 | 6 |
| E | do | 13 | 9.0 | 25 |
| F | do | 13 | 9.5 | 50 |
| G | do | 5 | 10.3 | 80 |
| H | Sodium palmityl-2-lactylate | 10 | 8.8 | 7 |
| I | do | 10 | 9.5 | 25 |
| J | do | 10 | >10.2 | 50 |
| K | do | 5 | >10.2 | 80 |
| L | Sodium behenyl-2-lactylate | 10 | 8.8 | 8 |
| M | do | 10 | 8.8 | 25 |
| N | do | 10 | 9.8 | 50 |
| O | do | 10 | >10.2 | 80 |
| P | Sodium stearyl-1-lactylate | 10 | 9.5 | 20 |
| Q | Sodium stearyl-3-lactylate | 10 | 10.2 | 10 |

EXAMPLE 2

The compositions given below essentially consist of the sodium fatty acid lactylate, the alcohol component (ethanol, glycol), water and added NaOH, the proportions being in percent by weight.

| | A | B | C | D |
|---|---|---|---|---|
| Sodium stearyl-2-lactylate | 10 | 10 | 5 | 10 |
| Ethanol | | 20 | 87.7 | 59 |
| Propylene glycol | 82.3 | | 5.0 | |
| Water | 6.5 | 67.7 | 1.7 | 29.1 |
| NaOH | 1.2 | 2.3 | 0.6 | 1.4 |
| pH | 8.7 | >10.2 | 8.3 | 9.7 |

EXAMPLE 3

Gelled deodorant compositions

| | A | B | C |
|---|---|---|---|
| Sodium stearyl-2-lactylate | 10 | 15 | 10 |
| Ethanol | 80 | 72.5 | 39 |
| Propylene glycol | 5 | 5 | |
| Hexachlorophene | 0.5 | 0.5 | 0.5 |
| 25% aqueous NaOH | 4.5 | 7 | 5.5 |
| Water | | | 45 |
| pH | 8.2 | 8.9 | 9.7 |

Analogous gelled deodorant compositions are obtained when the hexachlorophene is replaced by other known deodorant compounds, such as 3,4,4'-trichlorocarbanilide and bithionol.

EXAMPLE 4

Gelled sun screening compositions

| | A | B | C | D |
|---|---|---|---|---|
| Sodium stearyl-2-lactylate | 5 | 14 | 14 | 10 |
| Ethanol | 86.7 | 69.5 | 79 | 54.5 |
| Progylene glycol | 5 | 7 | 5 | |
| Amyl-p-N,N-dimethylaminobenzoate | 1 | | | |
| Glyceryl p-aminobenzoate | | 2 | | |
| 2-ethoxyethyl-p-methoxycinnamate | | | 1.5 | |
| 2-ethylhexyl salicylate | | | | 5 |
| 25% aqueous NaOH | 2.3 | 7 | 4.5 | 5.5 |
| Water | | | | 25 |
| pH | 8.3 | 9.5 | 8.2 | 9.7 |

EXAMPLE 5

Gelled pigmented compositions

| | A | B |
|---|---|---|
| Sodium stearyl-2-lactylate | 10 | 10 |
| Ethanol | 50 | 25 |
| Chalk | 25 | 50 |
| NaOH | 2.8 | 2.8 |
| Water | 5 | 5 |
| pH | 9.2 | 9.2 |

The sodium acyl-2-lactylates and also the sodium stearyl lactylate which have primarily been used in the above examples as illustrative of the invention are the representative sodium acyl lactylates most easily available commercially. Analogous compositions, for example, are obtained by replacement of the sodium acyl-2-lactylates by the sodium acyl 1 or 3 lactylates and replacement of the stearyl group with other acyl groups of saturated fatty acids having from 16 to 22 carbon atoms with appropriate adjustment of water content, pH and lactylate content which is easily ascertained empirically.

We claim:

1. A stable gelled alcohol composition having a gelled vehicle essentially consisting of a water soluble alkanol selected from the group consisting of ethanol, n-propanol and isopropanol and 2 to 50% by weight of water gelled formula

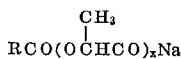

wherein RCO is the acyl radical of a saturated fatty acid of 16 to 22 carbon atoms and $x$ is a number between about 1 and 4 at a pH of at least about 8 which is sufficient to stabilize such gelled composition.

2. A stable gelled alcohol composition having a gelled vehicle essentially consisting of a water soluble alkanol selected from the group consisting of ethanol, n-propanol and isopropanol and 2–50% by weight of water gelled with 5–25% by weight of a sodium acyl lactylate of the formula

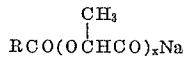

wherein RCO is the acyl radical of a saturated fatty acid of 16 to 22 carbon atoms and $x$ is a number between about 1 and 2 at a pH of at least 8 which is sufficient to stabilize such gelled composition.

3. The composition of claim 2 in which RCO is the stearyl radical.

4. The composition of claim 2 in which the water soluble alcohol component is ethanol.

5. The composition of claim 3 in which said gelled vehicle in addition contains about 2 to 10% by weight of a water soluble humectant polyol selected from the group consisting of glycerine and propylene glycols.

References Cited

UNITED STATES PATENTS

| 2,733,252 | 1/1956 | Thompson et al. | 260—410.9 |
| 2,970,083 | 1/1961 | Bell | 167—90 |
| 3,033,686 | 5/1962 | Landfried et al. | 260—410.9 XR |
| 3,098,795 | 7/1963 | Kreps | 167—90 |
| 3,141,030 | 7/1964 | Buddemeyer et al. | 260—410.9 |
| 3,275,503 | 9/1966 | Marnett et al. | 167—58 XR |

OTHER REFERENCES

Sagarin: Cosmetics Science and Technology, 1957, pp. 717–720, 726–730, 733–736 and 199 to 204.

ALBERT T. MEYERS, Primary Examiner

D. R. MAHANAND, Assistant Examiner

U.S. Cl. X.R.

252—522; 424—59, 60, 73, 357